United States Patent [19]
King et al.

[11] Patent Number: 5,707,548
[45] Date of Patent: Jan. 13, 1998

[54] MATERIALS AND DEVICE INCORPORATING PHOSHORS

[75] Inventors: Terence Alan King; Stephen Shuttleworth, both of Manchester; Sven Glyn Roden, Preston, all of United Kingdom

[73] Assignee: British Nuclear Fuels plc, Cheshire, United Kingdom

[21] Appl. No.: 507,331

[22] PCT Filed: Dec. 21, 1994

[86] PCT No.: PCT/GB94/02833

§ 371 Date: Oct. 6, 1995

§ 102(e) Date: Oct. 6, 1995

[87] PCT Pub. No.: WO95/18196

PCT Pub. Date: Jul. 6, 1995

[30] Foreign Application Priority Data

Dec. 24, 1993 [GB] United Kingdom ............... 9326413

[51] Int. Cl.$^6$ ................ C03B 8/02; C09K 11/02
[52] U.S. Cl. ............... 252/301.4 R; 501/12; 501/32; 501/39; 976/DIG. 439
[58] Field of Search ........... 252/301.4 H, 301.4 R; 501/12, 32, 39; 976/DIG. 439; 250/361 R, 462.1, 463.1, 464.1, 465.1, 466.1, 467.1, 484.4, 487.1

[56] References Cited

U.S. PATENT DOCUMENTS

| | | | |
|---|---|---|---|
| 4,661,704 | 4/1987 | de Leeuw et al. | 976/DIG. 439 |
| 4,818,877 | 4/1989 | Ayrai et al. | 976/DIG. 439 |
| 4,825,084 | 4/1989 | Braunlich et al. | 250/484.1 |
| 4,916,321 | 4/1990 | Shiraishi | 250/484.1 |
| 4,999,504 | 3/1991 | Braunlich et al. | 250/484.1 |
| 5,083,024 | 1/1992 | Takeda et al. | 250/327.2 |

FOREIGN PATENT DOCUMENTS

| | | |
|---|---|---|
| 2 165 234 | 4/1986 | United Kingdom . |
| 2 222 400 | 3/1990 | United Kingdom . |

OTHER PUBLICATIONS

Vol. 4 Engineered Material Handbook ASM International, 1991, Ceramics and Glasses pp. 124, 210–213, 445–451 No Month.

Hench et al, 1990, vols. 24–26 pp. 785–834 The Sol–Gel Glass Transformation of Silica, Advanced Materials Research Center, U of Fl. No Month.

Primary Examiner—Melissa Bonner
Attorney, Agent, or Firm—Nixon & Vanderhye P.C.

[57] ABSTRACT

A storage phosphor material comprising a storage phosphor of the kind in which electrons excited by incident ionizing radiation may be trapped in stable trap sites and subsequently released by stimulation such as photostimulation, wherein the phosphor is contained within a host matrix which comprises a sol-gel glass in which the storage phosphor is incorporated as a dopant.

3 Claims, 2 Drawing Sheets

MATERIALS AND DEVICE INCORPORATING PHOSHORS

The present invention relates to materials and devices incorporating phosphors especially storage phosphors, which may be used in the detection of radiation by stimulated luminescence.

In the prior art a phosphor material is known in which the following electronic processes may be obtained:
(a) ionization of a donor side above the valence band of the material by incident radiation;
(b) electron transfer to a stable trap site which is below, e.g. 1 to 2 eV below, the conduction band of the
(c) liberation of the electron from the trapped site by thermal stimulation or by photostimulation, e.g. applying incident optical radiation;
(d) decay of the liberated electron back into a donor site thereby releasing a photon as luminescence.

Such a phosphor may be used to detect ionizing radiation such as alpha, beta or gamma rays, X-rays and neutrons. The number of electrons excited and trapped is a measure of the intensity of the incident radiation and can itself be measured by detecting the number of photons released when the trapped electrons are photostimulated. The feature which distinguishes phosphors of the kind described from other known phosphors is the length of time the electrons can remain in their trapped sites. Such sites can be very stable and therefore reading by photostimulation of the number of electrons trapped can take place many hours after the original ionization. Furthermore, the total dose of radiation over a given period of time will be intended in terms of the number of electrons excited. The phosphors are therefore known as storage phosphors.

In the prior art, storage phosphors of the kind described have been incorporated as polycrystalline powder with an organic binder in a polymer film in a manner similar to a photographic film. Such films and their method of use are described for example in the article by Miyahara J., Takahashi K., Amemiya,, Kamiya N. and Satow Y. entitled "A new type of X-ray detector utilizing laser stimulated luminescence" in Nuclear Instruments and Methods in Physics Research, A246, p 572–578 (1986).

Although storage phosphor materials produced in the manner described have produced high sensitivity and dynamic range compared for example to conventional X-ray films, we have found that they are not ideal in all respects.

It is a purpose of the present invention in one aspect to provide an improved storage phosphor material.

According to the present invention in a first aspect there is provided a storage phosphor material comprising a storage phosphor of the kind in which electrons excited by incident ionizing radiation may be trapped in stable trap sites and subsequently released by stimulation such as photostimulation, wherein the phosphor is contained within a host matrix which comprises a sol-gel glass in which the storage phosphor is incorporated as a dopant.

Storage phosphor materials according to the present invention unexpectedly and beneficially have several advantages over those made using polymer films as in the prior art. The sol-gel glass forms an excellent highly transparent support material. Thus, the materials according to the present invention provide better optical coupling to the read-out systems, e.g. photostimulation and photoemission systems, and give better optical absorption of the photostimulation radiation and provide a host material with better mechanical rigidity and thermal and chemical stability. The materials can show the further benefits described below.

The storage phosphor in the material according to the present invention may, as in the prior art, comprise an alkaline earth fluorohalide doped with one or more rare earth, metals, e.g. a phosphor of the formula $BaFHa:R^{2+}$ where Ha is either Br or Cl and R is selected from one or more of Eu, Ce, Sm, La, Y and Gd, especially Eu.

Sol-gel glasses are well known in the optical glass field. They comprise a matrix prepared from condensation reactions of a solution, e.g. $Si(OH)_4$, to form a three dimensional network, e.g. based upon —Si—O—Si— chains. By drying, ageing and controlled sintering over temperatures in the range 100° C. to 1000° C. a porous glass is formed with a porosity dependent upon the processing temperature. During the sintering process porosity and refractive index increase.

The sol-gel glass may be pre-formed and subsequently doped with active phosphor by slow diffusion of the molecules of the phosphor e.g. as a colloid to give a uniform distribution throughout the matrix.

Alternatively, the phosphor may be introduced at the sol formation stage as an added powder and then subsequently formed into the gel and further densified.

The phosphor materials according to the present invention may be produced by moulding, spinning and other known processes and in the form of monolithic blocks, thin films, fibers or other forms in which sol-gel glasses are known.

Sol-gel glasses and their production are described for example in prior patent specification GB 2165234B and doping of sol-gel glasses is described for example in GB 2222400A. Production of a sol-gel glass incorporating a storage phosphor as dispersed dopant may employ techniques as described in these prior specifications.

The phosphor materials according to the present invention benefit from the very high optical quality obtainable from the host sol-gel glass. By determining the shape and form of the sol-gel host good optical coupling for many different storage phosphor applications may be achieved. As the phosphor is embedded in the sol- gel glass matrix it is protected from harsh environments, e.g. electric and magnetic fields, excessive or low temperatures, high humidity and chemical attack.

According to the present invention in a second aspect, an arrangement for use of a phosphor material according to the first aspect of the present invention comprises means for photostimulating the phosphor of the phosphor material whereby electrons trapped in trap sites are excited and released from such sites thereby to relax and emit photons and detector means for detecting the photons emitted by the phosphor.

The means for photostimulating may comprise a laser which may be a gas or solid state or dye laser and may for example be an Ar ion, Kr ion, He—Ne, He—Cd, Nd—YAG, semiconductor laser or OPO (optical parametric oscillator) source. The laser radiation may be continuous or pulsed.

The laser provides radiation which can act as primary read-out radiation to cause photostimulation of the phosphor material. The radiation may be applied directly via an open path or alternatively via an optical coupling means, e.g. comprising one or more fiber-optic guides. The primary read-out radiation may be passed through a band pass filter before application to the phosphor material.

The secondary radiation provided by photostimulation of the phosphor material may be incident via an open path on the detector means or alternatively may be collected by a collector, e.g. a fiber optic plate or wedge or guide and conducted e.g. by a fiber optic guide to the detector means.

The phosphor material may comprise a sol-gel glass plate or substrate. Primary read-out radiation may be incident on one major face of the plate or substrate. Secondary radiation produced by photostimulation may be collected in a reflection mode from the same face. Alternatively, secondary radiation may be collected in a transmission mode from the opposite face of the plate or substrate (from that on which the primary read-out radiation is incident).

Alternatively, primary read-out radiation may be applied at the edge of a plate or substrate comprising the phosphor material. Secondary radiation thereby produced may be collected from one or both of the main faces of the plate or substrate. In this mode the primary radiation may be guided through the plate or substrate thereby stimulating a strip of the phosphor material. Gunning laterally from the spot at which the radiation is injected.

The said phosphor material may itself comprise a fiber-optic sol-gel glass guide, e.g. a fiber-optic coil or a detector fitted at the end of a fiber-optic guide.

By using fiber optic guides in this way a sol-gel phosphor detector in a remote location, e.g. buried underground, may be readout via the guide or guides.

The primary read-out radiation may if desired be scanned across the surface of the phosphor material to be interrogated, e.g. in an X—Y raster fashion. A beam of the radiation may be deflected across the surface in a known way. Alternatively, this may be achieved by moving an optical guide through which the radiation is applied. The movement may be carried out automatically, e.g. controlled by a robotic device.

The detector means for detecting photons comprising the secondary radiation emitted by luminescence may comprise any suitable known photon detecting/counting device e.g. a photomultiplier tube or photodiode or semiconducting photodiode connected to an amplifier. The emitted photons, if emitted from the surface of the phosphor material on which the laser beam is incident, may be separated from the primary read-out radiation by one or more further band pass filters.

In use, in the said arrangement according to the second aspect, the image of given ionizing radiation stored in the phosphor material (where in the form of a plate) may be read-out on a pixel-by-pixel basis by the primary read-out radiation (provided by the means for photostimulating the phosphor) and the corresponding signals detected by the detector means for detecting photons may be stored, processed and subsequently displayed, e.g. on an electro-optical display, whereby the stored image is reproduced in visual form all in a known way. The output of the detector means may be digitised to represent photon count values obtained from individual pixels of the phosphor material and the digital values processed to build up an electronic image of the phosphor photon output. In order to achieve this, it is necessary to provide, in a known way, a reference signal to the signal processor which denotes the pixel on the phosphor material corresponding to the digital value being processed.

Examples of systems for the reading by photostimulation of images produced in a phosphor by ionizing radiation and the detection of photons thereby produced are also described in the prior art in the following patent specifications: U.S. Pat. No. 4,661,704; U.S. Pat. No. 4,778,995; U.S. Pat. No. 4,906,848; U.S. Pat. No. 4,973,134; U.S. Pat. No. 4,999,504; EP 423891A and U.S. Pat. No. 5,083,024. The known reading and detection techniques employed in the systems described in these specifications may be adapted for use in the said application of the present invention.

BRIEF DESCRIPTION OF THE DRAWINGS

Embodiments of the present invention will now be described by way of example with reference to the accompanying drawings, in which.

A phosphor material comprising a sol-gel glass doped with an active phosphor e.g. $BaFBr:Eu^{2+}$ is produced in one of the ways described above.

Figure 1A:
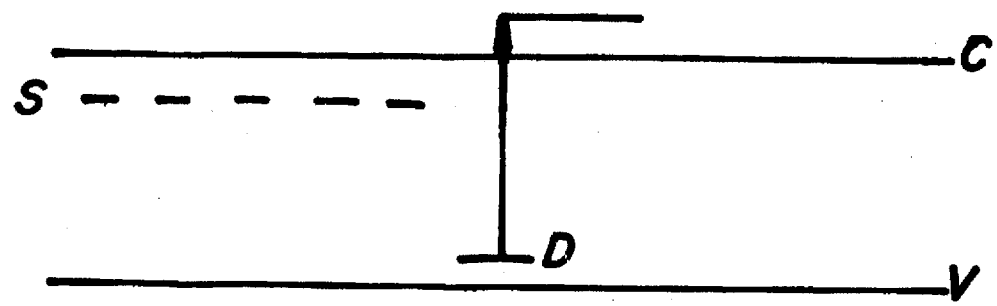
FIG. 1 is a series of energy level diagrams illustrating electronic energy state changes in a storage phosphor material.
Figure 1B:
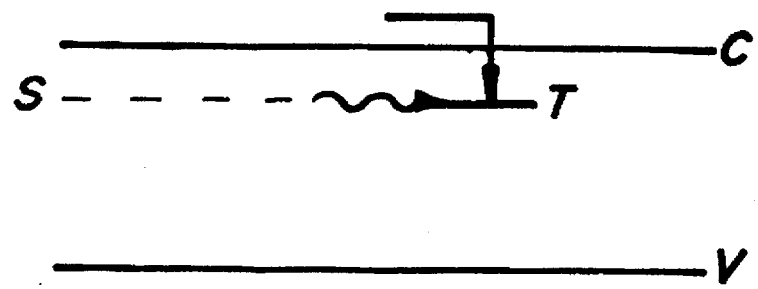
Figure 1C:
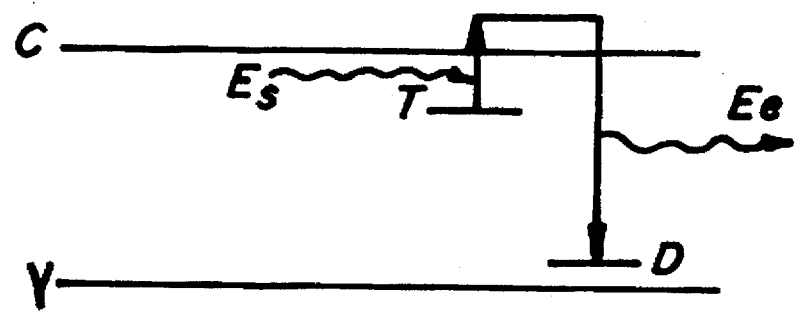

Electronic energy state changes obtained in use of the phosphor material are illustrated in FIG. 1. The valence band of the material is shown as the horizontal line V and the conduction band is shown as the horizontal line C. If the material is exposed to ionizing radiation an electron is released from a donor site D adjacent to but above the valence band V and is excited into the conduction band C as shown in FIG. 1a or to an intermediate excited state S. The excited electron will quickly relax or quantum mechanically tunnel into a thermally stable trap site T as shown in FIG. 1b where it can remain trapped for a long period of time. In due course, if the electron is photostimulated in the reading process by the application of a photon of energy $E_s$, then, as shown in FIG. 1c, the electron is re-excited and released from the trap site T and rapidly recombines and returns to its donor site D giving a longer wavelength photon emission of energy $E_e$.

Figure 2:
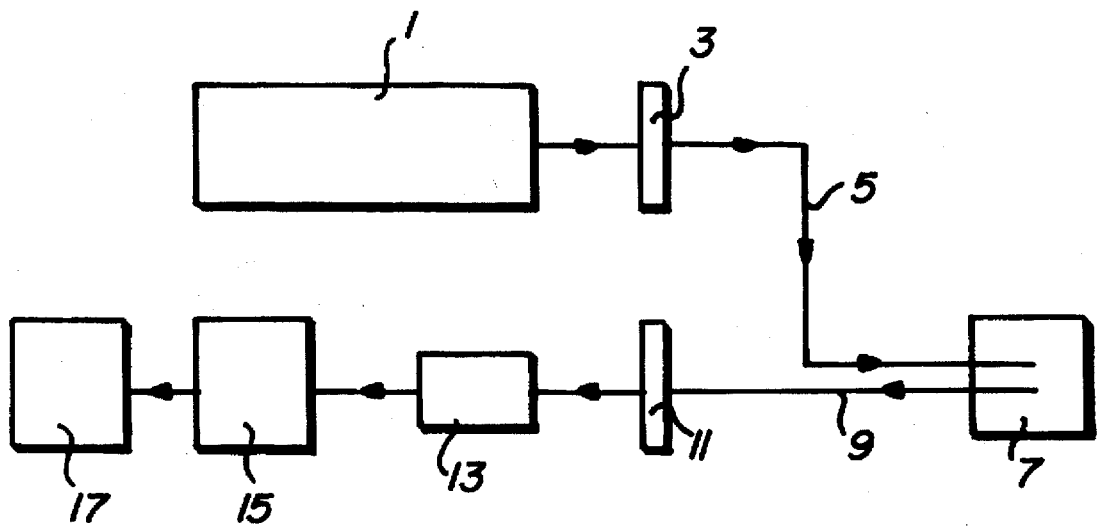
FIG. 2 is a diagram showing an arrangement for reading and detecting an image stored in a phosphor material.

FIG. 2 shows an arrangement for reading and detecting an image stored in a sol-gel phosphor material as illustrated in FIG. 1c. A laser source 1 provides output laser radiation which is filtered by a band pass filter 3 and conducted via a fiber optic guide 5 and is directed onto the front surface of a sol-gel plate detector 7 comprising phosphor material as described above. The laser source 1 thereby provides primary read-out radiation which causes photostimulation of the phosphor of the detector 7. Secondary radiation produced by the photostimulation is collected by a further fiber optic guide 9 and is transmitted via a further band pass filter 11 to an optical detector 13. The output of the detector 13 is processed by a signal processor 15. The signal processor 18 may include an analogue-to-digital converter (not shown) which facilitates digital signal processing in the processor 15. The processor produces an electronic image of the output of the detector 7 on a pixel-by-pixel basis. The output of the signal processor 15 may be displayed on a visual display 17.

The band pass filters 3 and 11 improve the performance of the arrangement by defining wavelength pass bands which facilitates discrimination of the wavelength of radiation being transmitted by the respective guides 5 and 9.

As an alternative to the method of coupling of primary radiation into one surface of the detector 7 and collecting secondary radiation from the same surface as in FIG. 2, FIG. 3 shows alternative method.

Figure 3A:
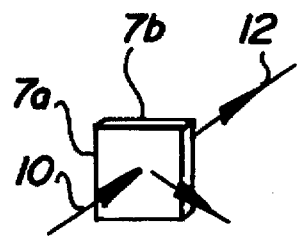
FIGS. 3, 4 and 5 are diagrammatic illustrations of alternative forms which the phosphor material detector employed in the arrangement shown in FIG. 1 may take.

In FIG. 3a, the primary read-out radiation (produced and filtered as in FIG. 2) is incident via a guide 10 on a front surface 7a of the detector 7 and the secondary radiation is extracted via a guide 12 in a transmission mode from a rear surface 7b. The secondary radiation may otherwise be detected and processed as in FIG. 2.

Figure 3B:
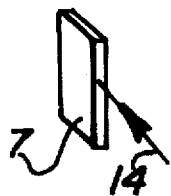

In FIG. 3b, the primary read-out radiation (produced as in FIG. 2) provides edge illumination of a plate comprising the detector 7 via a guide 14 connected to the edge of the detector 7. The secondary radiation may be collected as in FIG. 2 or FIG. 3a and then detected and processed as in FIG. 2.

Figure 4:
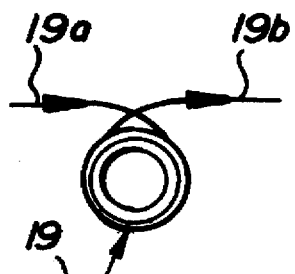

In FIG. 4, the detector 7 of FIGS. 2 and 3 is replaced by a fiber optic coil 19 which itself comprises a phosphor doped sol-gel. The coil 19 provides a large active area and surface. Photostimulation of the phosphor of the material of the coil 19 may be achieved by transmission of primary read-out radiation from a laser source via a filter (not shown) along the core of the fiber(s) comprising the coil 19 via a first end 19a of the coil 19. Secondary radiation may be collected via a second end 19b of the coil 19 and transmitted to a filter and detector (not shown) in the manner shown in FIG. 2.

Figure 5:
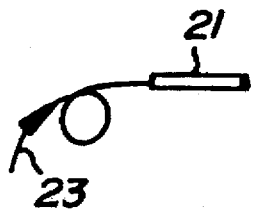

In FIG. 5 the detector 7 of FIGS. 2 and 3 is replaced by a sol-gel phosphor medium 21 fitted at the end of a fiber-optic guide 23. The primary read-out radiation (provided by a laser and filtered by a band pass filter as in FIG. 2) is conducted in one direction along the guide 23 and the secondary radiation produced by photostimulation of the medium 21 is conducted in the reverse direction along the guide 23 (and may be filtered and detected and the detected signal may be processed as in FIG. 2). The guide 23 may comprise duplex fibers or cables.

EXAMPLE

A probe of the kind illustrated in FIG. 5 was formed by inserting the end of an optical glass fiber which had been cleaned and etched in a dropper pipette having the end of its narrow portion coincident with the end of the fiber whereby an annular space was formed inside the pipette around the fiber. The ends of the fiber and the pipette were sealed together using epoxy resin. A sol-gel/phosphor mixture was introduced into the pipette and occupied the sealed space around the fiber at the bottom of the pipette. The phosphor material sank to the bottom of the sol-gel liquid containing it in the narrow part of the pipette. After a period of about 3 days the solution inside the pipette was densified and the phosphor formed a coating around the fiber toward its end supported by sol-gel. The pipette was cut at the top of the region occupied by the phosphor and the top of the pipette was sealed to the fiber thereby forming an encapsulated region, about 2 cm long, containing the sol-gel phosphor. The fiber having such a region formed on its tip could be used as a remote sensing probe in the manner described above.

Similarly other probes could be constructed by either inserting two or more etched optical fibers to form a fiber bundle in the pipette in the method of the above Example or by coating the sol-gel phosphor along the outside of one or more fibers.

In the above Example, an unclad optical fiber was coated with a microporous silica film prepared by the sol-gel process. The sol-gel solution wag made by mixing 12.5 ml TEOS (tetraethylorthosilicate) with 13.5 ml ethanol and 12 ml acid solution −0.05 ml HCl in 50 ml water. Predoping with storage phosphor BaFBr:Eu$^{2+}$ was carried out, and the final coating solution was formed after heating at 50° C. for 20 hours to 1 day.

We claim:

1. A process of preparing a storage phosphor material comprising a storage phosphor within a porous glass or dried gel matrix, said method comprising doping a porous glass or dried gel matrix by diffusing an active phosphor thereby uniformly distributing the active phosphor through the porous matrix.

2. The process as claimed in claim 1 wherein the active phosphor is applied to the matrix as a colloid.

3. A process of preparing a storage phosphor material comprising a storage phosphor within a porous glass or dried gel matrix, said method comprising the steps of:

(a) preparing a sol of Si(OH)$_4$ and a phosphor;

(b) forming the sol of step (a) into a three-dimensional network, and thereafter (c) drying, ageing and sintering the network over temperatures in the range of 100° C. to 1000° to form a porous glass or dried gel matrix in which the phosphor is uniformly distributed.

* * * * *